June 16, 1964
W. J. LANUM
3,137,765
PULLING SLEEVE FOR CONDUCTORS AND METHOD
OF INSTALLING CONDUCTORS
Filed Sept. 11, 1961
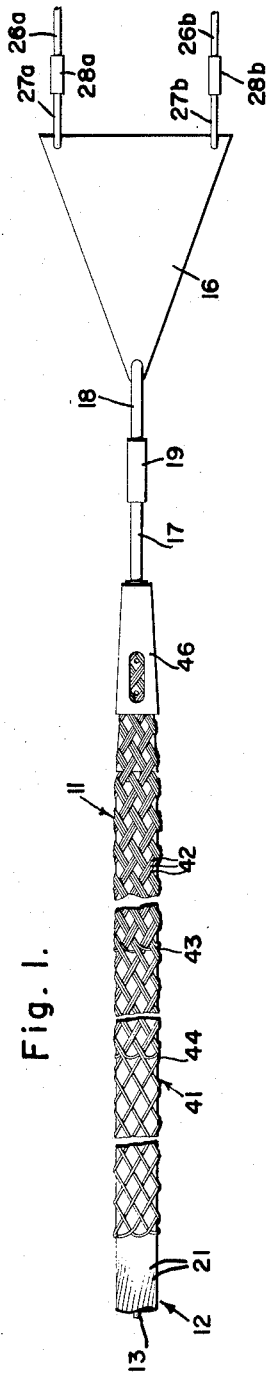
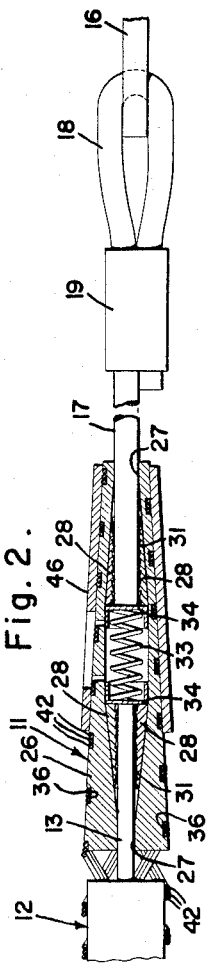
INVENTOR.
William J. Lanum
BY
*Julian Caplan*
attorney United States Patent Office 3,137,765
Patented June 16, 1964

3,137,765
PULLING SLEEVE FOR CONDUCTORS AND
METHOD OF INSTALLING CONDUCTORS
William J. Lanum, Concord, Calif., assignor, by direct
and mesne assignments, of one-half to Gerald A. Petersen, Santa Clara, and one-half to Anita E. Petersen,
Saratoga, Calif.
Filed Sept. 11, 1961, Ser. No. 137,179
5 Claims. (Cl. 174—90)

This invention relates to a new and useful improvement in pulling sleeve for conductors and, more particularly, relates to a sleeve attached to a conductor during tension stringing.

Tension stringing of electrical conductors is a new development whereby overhead lines are strung while maintaining the conductors in the air at all times to avoid damage to the conductors. Ordinarily, a pulling line of wire rope is attached to the leading end of the conductor and is then run through stringing sheaves attached to the crossarms of the poles or towers. Any damage which may occur by reason of contact with the ground is absorbed by the pulling rope. The function of the pulling line is to pull the conductor through the stringing sheaves. In the course of the operation, a pair of bull-wheels is used, one at each end of the line. The conductor is wound from its reel through the tensioner bull-wheel which applies a braking force to the pulling of the conductor while the wire rope is rewound through a puller bull-wheel and then back onto its reel. The bull-wheel on the puller is equipped with power for turning with a force greater than the braking action at the other end of the line and if the equipment is properly operated the conductor never touches the ground at any time during the stringing operation. Thus damage to the conductor is avoided, which is of importance in that such damage results in corona loss and also sets up radio interference at high voltages. Further, the use of tension stringing avoids obstructions such as pre-existing power and telephone lines, roads, streets and railroad tracks which must be traversed by the line being strung. Accordingly, tension stringing is becoming increasingly more important in the construction of electrical transmission lines both for high voltages and for low voltages.

Another modern development in power transmission line stringing arises out of the fact that increased power loads require installation of new conductors over the same right of way. A system of reconductoring is used wherein the pre-existing conductor, which is being replaced, is used in place of the wire rope heretofore mentioned to pull one or more new conductors. The new conductors may be of increased diameter. Further, frequently one conductor is replaced by a plurality of new conductors, usually of the same phase. The present invention finds particular application in reconductoring.

A still further development in tension stringing is the use of conductors made up of a plurality of strands. A central core of wire rope is located at the center of the conductor and imparts increased tensile strength to the conductor. Surrounding the core is at least one layer of helically wound rods of conductive material, such as aluminum or copper. In actual practice there are usually several layers of such rods all concentric with the steel core. The rods are relatively soft and easily damaged, and an important feature of tension stringing is to avoid such damage to the rods either by abrasion upon contact with the ground or by crushing or otherwise abrading the conductors during the pulling operation. The present invention is used in connection with conductors of the type herein mentioned.

The principal purpose of the present invention is to provide means whereby the pulling force of the stringing operation is absorbed both by the central wire rope core and by the exterior strands of the conductor and thereby a greater pulling force may be exerted than could be carried by the steel core, whereas the crushing force applied to the exterior of the conductor is not sufficient to damage the same. Where reconductoring is performed the conductor being removed is likewise protected in the same fashion so that the replaced conductor may be reinstalled in some new location in undamaged condition.

An important result of the present invention, therefore, is to enable the installer of the conductor to use tensions greater than could be sustained either by the steel core itself or by the rods on the exterior of the conductor. Correspondingly another feature of the invention is the fact that the conductor is not crushed or damaged, nor is the central core stretched beyond its elastic limit during the tension stringing.

Another advantage of the invention is the fact that the coupling may be rapidly installed and removed and that no unusual tools or equipment are required.

A still further advantage of the invention is the fact that the connector will pass around the bull-wheel without interference and hence does not interfere with normal tensioning operations. This result is achieved because the connector is not stiff through an extended length.

Another feature of the invention is the fact that it may be adapted for use with a variety of different sizes of conductors and pulling lines and reduces the number of different sizes which must be stocked.

A still further feature of the invention is the fact that it is useful either in a direct pull of the new conductor by an old conductor which is being replaced, or it may be used to transmit the pull of a running block, evener or spreader where several new conductors are being installed at the same time.

Further, the invention is useful in situations where one conductor pulls one new conductor, or in other situations where one conductor pulls several new conductors.

Other objects of the present invention will become apparent upon reading the following specification and referring to the accompanying drawings in which similar characters of reference represent corresponding parts in each of the several views.

In the drawings:

FIG. 1 is a top plan view showing the device installed in a system wherein an existing conductor is being replaced by a plurality of new conductors.

FIG. 2 is an enlarged view of a portion of FIG. 1, with parts broken away in section to reveal interior construction.

As shown in FIG. 1, there is provided a pulling connector 11 which may be installed in any of several environments. Thus, a wire rope used in initial installation may be attached to the connector and the connector to a new conductor. However, as shown in FIG. 1, in reconductoring the rods or conductive strands of the old conductor 12 have been stripped back to expose the core 13, and the other end of the connector is attached to a running board 16 evener or spreader by using a short piece of cable 17, preferably larger than core 13, held at its leading end in connector 11 and at its other end formed in an eye 18 passing through a hole in the leading end of running board 16 and held in shape by means of a convention "shotgun" splice 19, well known in this art. As has heretofore been mentioned, the old conductor 12 has a core of several strands of steel wire 13 surrounded by helically layed layers of conductive rods 21. The present invention provides a connector 11 or coupling whereby the tension applied to the pulling cable 12 transmitted to the cable 17 is characterized by the fact that such tension is imparted both from the central steel core 13 as well as to the external strands of conductor rods 21. The running board 16 may be used to pull a pair on new conductors (not shown) and for such purpose the trailing edge of running board 16 receives a pair of short cables 26a, 26b, each formed with an eye 27a, 27b passing through holes in the board 16 and held in place by a shotgun splice 28a, 28b. Cables 26a, 26b may be attached to the new conductor by any convenient means. The cables 26a, 26b may also comprise the stripped-back wire cores of the new conductors. Correlatively, the pulling force may be applied from conductor 12 to the connector 11 and thence to a single new conductor the core of which is represented by cable 17, in which case board 16, eye 18 and splice 19 are eliminated.

The connector 11 comprises a splice-member cigar-shaped casing 26 having a exterior which tapers inwardly at the trailing end and having a hollow center, the walls of which taper inwardly at either end. An opening 27 is provided in each end sufficient to receive core 13 and cable 17. It will be understood that core 13 and cable 17 are preferably unequal in size so as to receive a large diameter cable at one end and a smaller diameter cable at the other. At each end a plurality of jaw members 28 is provided which are movable longitudinally of the inside of casing 26. The outside of each jaw member 28 is tapered so that as the jaw moves toward the end of casing 26 it is forced inwardly. Each jaw member has a plurality of teeth 31 on its inside face which grip the cable with increased bite as the jaws move toward the end of the splice. A helical spring 33 is disposed in the interior of the splice and bears against cups 34 pressing outward the ends of jaws 28, initially biasing them into engagement with the cable. It will be apparent that the operation of this portion of the conductor is for practical purposes automatic in that the end of core 13 is pushed into its opening 27 of the splice. Thereafter, movement of the splice relative to the conductor causes an increased bite of the teeth 31 of the jaws on the core, so that the greater the pull the more effective the grip of the splice on the cable. In this connection, reference is made to Patent No. 2,144,050 as showing a splice on which the present invention is an improvement. The jaws on both sides of the splice are similar, but preferably the size of such jaw members is different at each end.

A feature of the present invention is the formation on the exterior of the casing of intersecting, reticulated, helical shallow grooves 36 for a purpose hereinafter explained.

Another means of connecting cables to a pulling means is the use of a cable grip known in the trade as a "Kellems" grip or stocking grip 41. Such a grip 41 is formed of reticulated wires 42 woven, as shown in the accompanying drawings, in helical patterns which intersect in diamond-shaped interstices. Preferably, the grip 41 comprises three or more strands 42 at its forward section, the third strand of each series of strands terminating at a position 43 spaced from the end and for another section of its length the grip is formed of two strands and at its remote end 44 of one strand. The total length of the grip for large conductors may be as much as three feet or more. A feature of this type grip 41 is that as an endwise pull is applied to the grip, it tends to lengthen and as it lengthens its construction causes a reduction in the internal diameter of the grip. Hence, the greater the tension applied to the girp the tighter it tends to grip the conductor over which it is installed. Another feature of this type stocking cable grip is the fact that if the rear end thereof is forced toward the forward end, the grip expands in internal diameter permitting it to be slipped over the end of the conductor. Release of the inward pressure on the trailing end of the grip causes it to contract and to engage the exterior face of the conductor. Pulling of the forward end of the grip then results in a firmer attachment of the grip to the conductor.

The strands 42 of the stocking grip at its forward end are fitted into the shallow grooves 36 on the exterior casing 26, the number and angular position of the grooves 36 corresponding to that of the wire strands 42 of the grip 41 when the grip is taut. Hence, the stocking connector 41 is in firm engagement with the casing 26. Where necessary, means may be employed to hold the stocking connector 41 on the exterior of the casing 26, this being particularly useful when no pulling force is being exerted. Thus, a compression sleeve 46 or band may be forced over the portion of the strands 42 in grooves 36 and tightened, securing the grip in the grooves of the casing.

The pulling force applied to the forward cable 12 is thus partially transmitted by grip 41 to the exterior of casing 26 of the splice 11 and is partially transmitted by the wire core 13 to connector 11. From splice 11 the force is transmitted to larger cable 17. Thus, a sufficient pulling force may be exerted for proper tension stringing, yet an excessive pull is not transmitted by core 13 alone which might tend to stretch core 13 beyond its elastic limit, while at the same time the full pull of the stringing operation is not transmitted by the exterior strands 21 of conductor 12 which might tend to crush or otherwise damage the same.

A method of reconductoring is achieved by use of the following steps: There is first provided a pulling conductor 12 which may comprise core 13 of an old conductor rod 21 of conductive material being stripped back to expose a section of the core 13.

A running board 16 is provided and to its leading edge is spliced cable 17. The trailing edge is connected to a plurality of new conductors; alternatively, cable 17 may be the exposed core of a single new conductor.

The next step in the performance of the method is to splice wire cores 13 to cable 17 by means of splice 11 which, by means of jaws 28, grips each of the wires in a manner whereby an increase in tension causes an increase in gripping.

The next step in the performance of the method is to transmit from the exterior strands 21 of the bundle of strands of conductor 12 part of the pulling force not transmitted by the core 13 thereof. The exterior of the casing 26 of the splice is attached to the external strands 21 of conductor 12 by means whereby an increase in tension results in an increase in gripping of both the splice 11 and the external strands 21.

After the two connections are made, the old conductor or cable 12 is pulled with a sufficient force to accomplish tension stringing and prevent the new conductors from coming in contact with the ground or sagging against pre-existing wires, buildings, roadways, railroad tracks, highways and the like. This method transmits the pulling force to the new conductors and by means of well-known tension stringing equipment a pulling force is applied to the leading end of the old conductor or pulling line 12 which is greater than the braking action applied by tension stringing equipment to the new conductors as they are reeled out of their reels.

Upon completion of the installation of the new conductor, the connections heretofore mentioned are removed by reverse operation.

Although the foregoing invention has been described in some detail, by way of illustration and example for purposes of clarity of understanding it is understood that certain changes and modifications may be practiced within the spirit of the invention and scope of the appended claims.

What is claimed is:

1. Means for connecting a wire rope core to a conductor having a second wire rope core surrounded by a plurality of helical conductive rods, said means comprising a splice having a tubular casing having interior walls sloping inwardly from the center toward either end, a first and a second set of gripping jaws inside said casing, and spring means interposed between said sets of jaws biasing them toward opposite ends of said casing to cause said jaws to grip said first wire rope core and said second wire rope core, respectively, inserted therebetween, and an elongated stocking-type cable grip at least partially enclosing said casing, said cable grip having a reticulated pattern of pluralities of strands of wires, said cable grip being expandable and contractable and in expanded condition being large enough to fit over the outside of said conductive rods, the exterior of said casing being formed with a reticulated pattern of grooves receiving said strands of wire to cause engagement of said cable grip with said casing, said cable grip extending outwardly on one end of said casing.

2. Means according to claim 1, which further comprises a compression sleeve around a portion of said cable grip locking a plurality of strands of said cable grip in corresponding grooves on said casing.

3. In combination, a first wire core, a second wire core, a plurality of layers of conductive rods disposed around said second wire core, said second wire core having an end projecting beyond the ends of said rods, a hollow casing having an inner wall converging toward either end, first jaws bearing against said inner wall at one end and shaped when closed to grip said first wire core, second jaws bearing against said inner wall at the end opposite said first jaws and shaped when closed to grip said second wire core, resilient means biasing said first and second jaws away from each other and in cooperation with said converging walls each of said jaws toward closed position, said first jaws gripping said first wire core and said second jaws gripping said second wire core, said rods terminating adjacent said casing and said second wire core extending into said casing, said casing having its exterior formed with a reticulated pattern of shallow grooves, and a stocking type cable grip formed of a plurality of strands of wire in a sleeve-like second reticulated pattern complementary to the pattern of said grooves and characterized by the fact that longitudinal compression expands the inside diameter of said cable grip and longitudinal extension contracts said inside diameter, said cable grip surrounding a portion of said casing and fitting in said grooves and also extending outward beyond said casing and surrounding a portion of said conductive rods, whereby part of a strain imposed on said first wire core is transmitted to said second wire core and part to said conductive rods.

4. The combination of claim 3, in which one of said wire cores is of greater diameter than the other and the corresponding set of said jaws gripping said wire core are greater than the other set of said jaws.

5. Means for connecting a wire rope to a conductor having a second wire rope core surrounded by a plurality of conductive rods, said means comprising a splice having a casing, a first and a second set of gripping jaws inside said casing, and means biasing said jaws to gripping position to cause said jaws to grip said first wire rope core and said second wire rope core, respectively, inserted therebetween, and an elongated stocking-type cable grip at least partially enclosing said casing, said cable grip having a reticulated pattern of pluralities of strands of wires, said cable grip being expandable and contractable and in expanded condition being large enough to fit over the outside of said conductive rods, the exterior of said casing being formed with a reticulated pattern of grooves receiving said strands of wire to cause engagement of said cable grip with said casing, said cable grip extending outwardly beyond one end of said casing.

References Cited in the file of this patent

UNITED STATES PATENTS

| | | |
|---|---|---|
| 2,143,985 | Kellems | Jan. 17, 1939 |
| 2,155,053 | Kuenzi | Apr. 18, 1939 |
| 2,158,892 | Becker et al. | May 16, 1939 |
| 2,434,358 | Frank | Jan. 13, 1948 |
| 2,503,814 | Flagler | Apr. 11, 1950 |
| 2,650,400 | Kellems | Sept. 1, 1953 |

FOREIGN PATENTS

| | | |
|---|---|---|
| 1,079,398 | Germany | Apr. 7, 1960 |